(12) United States Patent
Vella et al.

(10) Patent No.: US 7,617,287 B2
(45) Date of Patent: Nov. 10, 2009

(54) CELLULAR MESSAGING ALERT METHOD AND SYSTEM

(75) Inventors: Donald J. Vella, Naples, FL (US); Jeffery N. Ream, Henderson, NV (US); Gail F. Stradley, Henderson, NV (US); William W. Watts, Austin, TX (US); James T. DiGiovanni, Hazlet, NJ (US)

(73) Assignee: RGA Intl, Inc., Naples, FL (US)

( * ) Notice: Subject to any disclaimer, the term of this patent is extended or adjusted under 35 U.S.C. 154(b) by 816 days.

(21) Appl. No.: 10/388,654

(22) Filed: Mar. 17, 2003

(65) Prior Publication Data

US 2004/0103158 A1 May 27, 2004

Related U.S. Application Data

(60) Provisional application No. 60/429,309, filed on Nov. 27, 2002.

(51) Int. Cl.
*G06F 15/16* (2006.01)
*H04M 11/04* (2006.01)

(52) U.S. Cl. .................. 709/207; 455/404.1
(58) Field of Classification Search .......... 709/238, 709/204, 206, 207; 455/466, 404.1
See application file for complete search history.

(56) References Cited

U.S. PATENT DOCUMENTS

| | | | |
|---|---|---|---|
| 6,002,748 A * | 12/1999 | Leichner | 379/48 |
| 6,112,074 A | 8/2000 | Pinder | |
| 6,369,707 B1 | 4/2002 | Neer | |
| 6,377,172 B1 | 4/2002 | Neer | |
| 6,404,880 B1 | 6/2002 | Stevens | |
| 6,463,273 B1 * | 10/2002 | Day | 455/404.1 |
| 6,745,021 B1 | 6/2004 | Stevens | |
| 6,775,255 B1 * | 8/2004 | Roy | 370/331 |
| 6,816,878 B1 * | 11/2004 | Zimmers et al. | 709/200 |
| 7,039,386 B2 * | 5/2006 | Kolsrud | 455/404.1 |
| 2002/0019228 A1 * | 2/2002 | McKenna et al. | 455/435 |
| 2003/0143974 A1 * | 7/2003 | Navarro | 455/404 |

OTHER PUBLICATIONS

"Cal Poly Implements Emergency Text Message Alert System", News Release, California Polytechnic State University, San Luis Obispo, CA 93407, Dec. 19, 2007.
"Oregon State U Plans Cell Phone Net to Warn of Campus Violence", Associated Press, Nov. 5, 2007.
Brian Krebs: "T-Mobile Investigating Data Breach Claims", washingtonpost.com, Jun. 8, 2009.

* cited by examiner

*Primary Examiner*—Andrew Caldwell
*Assistant Examiner*—Bradford F Fritz
(74) *Attorney, Agent, or Firm*—Sughrue Mion, PLLC

(57) ABSTRACT

An efficient method and system for utilizing existing wireless communication devices and networks, such as cellular phones and carriers, as an underlying infrastructure in providing emergency information to a targeted percentage of the population in a specified geographical location, without requiring individuals to subscribe to an alerting service and without using information solicited from or provided by the intended recipients of the alert.

22 Claims, 8 Drawing Sheets

To choose an individual state and/or county to send your authorized notification     "Click Here" —405

To choose a selected security force     "Click Here" —410

OR

To send a message to a region, hold the left mouse button and drag a box —420
around the target area of the map & release.

To select a region of the U.S. use this jump-menu: [NorthWestUS ▼] [Go]  —430

You have targeted *1309500* recipients in: —605
-NJ-PA-
Please enter your alert message below.
——610
Messages are limited to 140 characters. —620
You have [140] remaining. —625
[Send]   [Clear]
640      645

700

*(Click to select, hold the ctrl button to select multiple items)* — 705

— 720

*Please enter your alert message.*

— 730

[140] characters left — 740

[Clear] — 750

[ ] Authentication Code — 760

[ ] User Name — 765

[Send]

CELLULAR MESSAGING ALERT METHOD AND SYSTEM

BACKGROUND OF THE INVENTION

1. Field of the Invention

This application is an application filed under 35 U.S.C. § 111(a), claiming benefit pursuant to 35 U.S.C. § 119(e) of the filing date of the Provisional Application Ser. No. 60/429,309 filed on Nov. 27, 2002, pursuant to 35 U.S.C. § 111(b). The Provisional Application Ser. No. 60/429,309 is incorporated herein by reference for all it discloses.

This invention relates generally to the field of alert systems and, more specifically, to a method and system for providing an alert using wireless telecommunication technology.

2. Background and Related Art

Various mechanisms exist to alert the public, such as the Emergency Alert System (EAS). The EAS, which replaced the Emergency Broadcast System in 1994, was established by the FCC as a tool for the President and others to warn the public about emergency situations. In the EAS system, described at http://www.fcc.gov/eb/eas/ which is incorporated herein by reference, broadcast stations and cable systems are used to disseminate emergency information at federal, state, and local levels.

Another approach is to use a specific location alert receiver to alert members of the public. For example, such a receiver can be a device that is plugged into a common household electrical outlet. The alert of the receiver is activated by an incoming transmission from an authorized authority with access to a transmitting source in the specific area of the devices such as cell phone towers or transmitting vehicles and activates any number of devices within one home and/or all homes simultaneously. Additionally, the device can be mobile so as to be powered at remote locations.

Yet another approach is to require users to subscribe to an alerting service, wherein a subscriber database is maintained for storing information on the subscribers. Users may be required to pay a subscription fee in order to receive alerts from the alerting service. Additionally, these services often require a user to provide personal information beyond what is necessary to alert the user, for example, information on age, gender, yearly income, etc.

However, public broadcasting systems such as the EAS suffer from various drawbacks. For example, broadcasting alert information to all of the radios and televisions in a particular location may not be effective in reaching those individuals who are not near a radio or television.

Furthermore, a person's radio and/or television must be turned on in order for them to receive the alert information. Unlike with cellular phones, these devices are usually not turned on except during actual use by their owner. Even further, these broadcasting systems are limited in their ability to narrowly target a percentage of the population and/or a specific location, wherein those persons receiving the alert who are outside of the hazard area may become desensitized to future alert broadcasts. Further still, these broadcasting systems indiscriminately provide the alert information to an area and fail to consider that individuals may be outside the alert area, for example, away on vacation. Even further, because periodic test broadcasts may be required to insure that the broadcasting system is in working order, the population at large may become desensitized to broadcast alert indications.

Likewise, devices such as specific location alert receivers also have various drawbacks. For example, users are required to purchase, install, and maintain separate equipment for the purpose of receiving alerts. Furthermore, users must carry around this additional equipment in order for it to be effective in providing alerts away from the user's home.

Additionally, subscription-based alert services also have various drawbacks. For example, users must provide their information in advance to receive any alerts, and often must pay a periodic subscription fee as well. Thus, in practice, users may not have the time, energy, desire, etc. to proactively subscribe to an alert service. Furthermore, users are discouraged from subscribing to these alert services out of fear that their personal information may be misused, such as for sending unsolicited messages (i.e., spam), or simply sold to third parties without their consent. Also, users may deem these services cost prohibitive.

Furthermore, subscription alert services require users to voluntarily subscribe. Therefore, because a large percentage of cell phone owners elect not to subscribe to any alert service, subscription alert services represent an ineffective tool for alerting a large percentage of the population in a targeted geographical region.

Thus, there is an unmet need for utilizing existing wireless communication devices and networks, such as cellular phones and carriers, as an underlying infrastructure in providing emergency information to a targeted percentage of the population in a specified geographical location, without requiring individuals to subscribe to an alerting service and without using information solicited from or provided by the intended recipients of the alert.

Indeed, there are approximately one-hundred seventy-three million cell phones in North America, with the number increasing yearly. This roughly breaks down into one-hundred thirty-seven million cell phones in the United States, twenty-three million cell phones in Mexico, and thirteen million cell phones in Canada. Furthermore, nearly all of these phones are capable of receiving and displaying text messages.

BRIEF SUMMARY OF THE INVENTION

Accordingly, it is an aspect of the present invention to provide an effective means of notifying a large percentage of the population in a given geographical area of an event, message or individual, without requiring that they be near a television or radio or that they have a television or radio turned on.

It is another aspect of the present invention to provide an effective means for narrowly targeting a percentage of the population and/or one or more specific locations.

It is yet another aspect of the present invention to provide an effective means for providing an alert to one or more specific locations, wherein only those individuals present in the specific locations receive the alert.

It is another aspect of the present invention to provide a reliable means for providing an alert to a large percentage of the population and/or one or more specific locations, wherein redundant equipment and intelligent system design increase reliability and obviate the need for constant testing.

It is yet another aspect of the present invention to provide an effective means for alerting individuals with wireless communications devices, wherein the individuals do not need to purchase, install and maintain separate equipment in order to receive an alert, as well as transborder alerts.

It is another aspect of the present invention to provide an effective means for alerting individuals with portable communications devices, which the individuals normally carry on their person, and therefore the individuals do not need to carry any additional equipment on their persons in order to receive an alert.

It is yet another aspect of the present invention to provide an effective and easy-to-use tool for Law Enforcement Agencies and other Emergency Management Officials to send alert messages at the national, regional, state and local levels.

It is another aspect of the present invention to provide the Department of Homeland Security with an effective and easy-to-use tool for alerting the public in any and all geographic areas.

It is yet another aspect of the present invention to provide an effective and easy-to-use tool for enhancing security at high profile locations such as airports, points of entry such as ports and border checkpoints, and at special events such as the Super Bowl.

It is another aspect of the present invention to provide an effective and easy-to-use means for combining text and image data in order to generate a more useful multimedia alert.

It is yet another aspect of the present invention to provide a more effective outlet for information normally broadcast using the EAS, such as information relating to an abducted child or a severe weather emergency.

It is another aspect of the present invention to provide a means for simplifying and speeding up the designation of one or more geographic areas to which an alert is to be delivered.

It is yet another aspect of the present invention to provide an intuitive interface for selecting an area for an alert to encompass and for inputting data related to the alert.

It is another aspect of the present invention to provide a means for effectively transforming an individual's cell phone into an alert message receiver.

It is yet another aspect of the present invention to provide a means for effectively alerting the public that utilizes existing cellular networks.

The present invention satisfies the aforementioned objects and provides the aforementioned advantages. Herein various exemplary embodiments of the present invention are described. For example, the present invention encompasses a method for providing an alert message, comprising (a) selecting at least one location for the alert to encompass; (b) determining at least one phone number based on the selected at least one location, each phone number corresponding to a wireless device; (c) inputting message data; (d) generating an alert message using the message data; and (e) sending the alert message to said at least one wireless device in the selected at least one location.

Additionally, the present invention encompasses a system for providing an alert message, comprising (a) a web interface server, (b) a launch server; and (c) a system database, wherein the web interface server, the launch server, and the system database are connected. An alert originator connects to the web interface server and selects a location for the alert to encompass. The web interface server then accesses a system database to determine phone numbers corresponding to the selected location, wherein each phone number belongs to a wireless device of a potential alert recipient. The web interface server collects message data input by the alert originator. The web interface server transfers each determined phone number and the message data to a launch server, and the launch server generates an alert message from the message data. Finally, the launch server sends the alert message to the wireless devices corresponding to the determined phone numbers in the selected location.

Further objects, features and advantages of the present invention will become apparent from consideration of the following description and the appended claims when considered in connection with the accompanying drawings.

BRIEF DESCRIPTION OF THE DRAWING FIGURES

With specific reference now to the drawings in detail, it is stressed that the particulars shown are by way of example and for purposes of illustrative discussion of the exemplary embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the invention may be embodied in practice. In the accompanying drawings:

DETAILED DESCRIPTION OF EXEMPLARY EMBODIMENTS

The following is a detailed description of various illustrative, non-limiting embodiments of the present invention.

Figure 1:
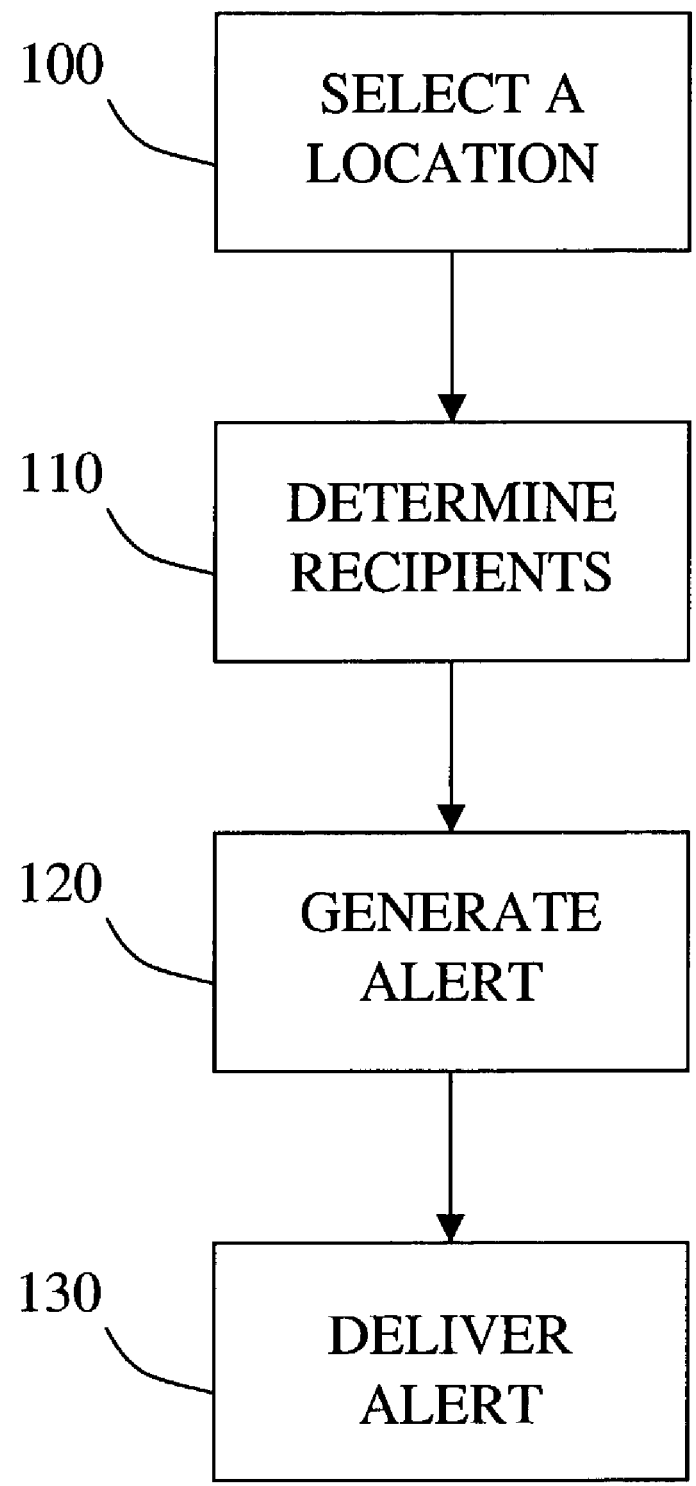
FIG. 1 illustrates an exemplary method for providing an alert.

FIG. 1 illustrates a method that can be used by an alert originator, such as a law enforcement agency or an emergency management official, to alert a large percentage of the population in a geographic area of an event, message or individual. Initially, the alert originator selects a location for the alert to encompass (S100). Any manner of data input can be used to select the location.

Preferably, but not necessarily, a hierarchical series of menus are provided to the alert originator to select the location. For example, a listing of all fifty states is provided. Upon selecting a particular state, a listing of all of the counties in the state is provided. Alternatively, a listing of major cities, major airports, etc. in the state can be provided. Use of a hierarchy of menus provides a simple mechanism for the alert originator to quickly and narrowly target the intended recipients of the alert. Additionally, the information on states, counties, cities, airports, etc. is readily available through government resources and other documented resources.

Preferably, but not necessarily, maps are displayed to the alert originator for selecting the location. For example, maps of the continental United States, Alaska, Hawaii and regional maps can be displayed. Additionally, maps of other countries, such as Canada or Mexico, could be displayed. The alert originator uses an input device, such as a mouse or stylus, to draw a right-angle geometric shape on the map. The geometric shape indicates the area for the alert to be sent. The maps can be proprietary or supplied by a third party, such as Maponics.

Preferably, but not necessarily, the maps are in a Mercator format. This format allows for a flat image to be plotted with longitude and latitude on an area that is spherical. The maps can be calibrated by using a mathematical equation that converts the pixels of the image into degrees of longitude and latitude. By utilizing known points of longitude and latitude, as supplied for example by National Geographic, two points are defined on the map image. The two points are separated by "X" number of degrees, and they are also separated by "X" number of pixels. The product is a ratio that can be utilized to define pixels as degrees and calibrate the rest of the map image.

Preferably, but not necessarily, the alert originator draws the geometric shape on the map using a software program, which defines an initial pressing "click" of the input device as a starting point (with coordinates x1, y1) and the subsequent releasing "click" of the input device as an ending point (with coordinates xc, yc), wherein c equals the current position. Thus, an upper left and a lower right set of coordinates are obtained, and the intersection of the vertical and horizontal lines completes the geometric shape.

Preferably, but not necessarily, a list of predefined locations is provided to the alert originator to select the location for the alert. For example, a database storing information on locations where large numbers of people gather such as airports, shopping malls, etc. can be used to generate the list. Additionally, the alert originator can search the database based on various search criteria such as "display only airports" or "display only locations currently open for business", in order to have a customized list displayed. The contents of the database are updated as needed.

Preferably, but not necessarily, the alert originator contacts a website to select the location. For example, the alert originator can contact the website via the World Wide Web or via a dedicated line.

Once the alert originator has selected a location (S100), the recipients of the alert are determined based on the selected location (S110). For example, a database stores information including contact information, such as phone numbers, as well as geographic information. Thus, after the location is selected, the database is accessed to determine the recipients of the alert based on the selected location.

Having determined the recipients for the alert (S110), an alert is generated (S120). For example, the alert originator is prompted for any data to be included in an alert message, such as text and/or image data.

Preferably, but not necessarily, the alert originator contacts a website to input the text data for the alert message. For example, the website can provide a text box for collection of the text data, whereby the alert originator types their text data directly on the website. Because some text message standards (e.g., SMS) place character limits on their messages, a character counter can be provided for notifying the alert originator how many characters have currently been input. Additionally, a maximum number of characters allowed can be displayed. By subtracting the current character count from the maximum characters allowed, the alert originator can be notified of how many additional characters can be entered before the character limit is reached.

If the alert originator wants to include image data, for example a picture, in the alert message, the alert originator is prompted to provide the image data. For example, the alert originator can e-mail the image data (e.g., a JPEG image file) to a particular address, such as that of the website, or use a file transfer program, such as one based on the File Transfer Protocol, to transfer the image data to a specified location, such as that of the website. Furthermore, predefined images/icons can be presented to the alert originator to designate for inclusion in the alert message.

Finally, after an alert message is generated to include any data input by the alert originator (S120), the alert is delivered to the intended recipients (S130). For example, the alert message is sent to the recipients as a text message, such as an SMS message. The alert message can be sent over the Internet to the various communications service providers servicing the recipients, wherein the recipients receive the alert in a timely and simple manner.

Figure 2A:
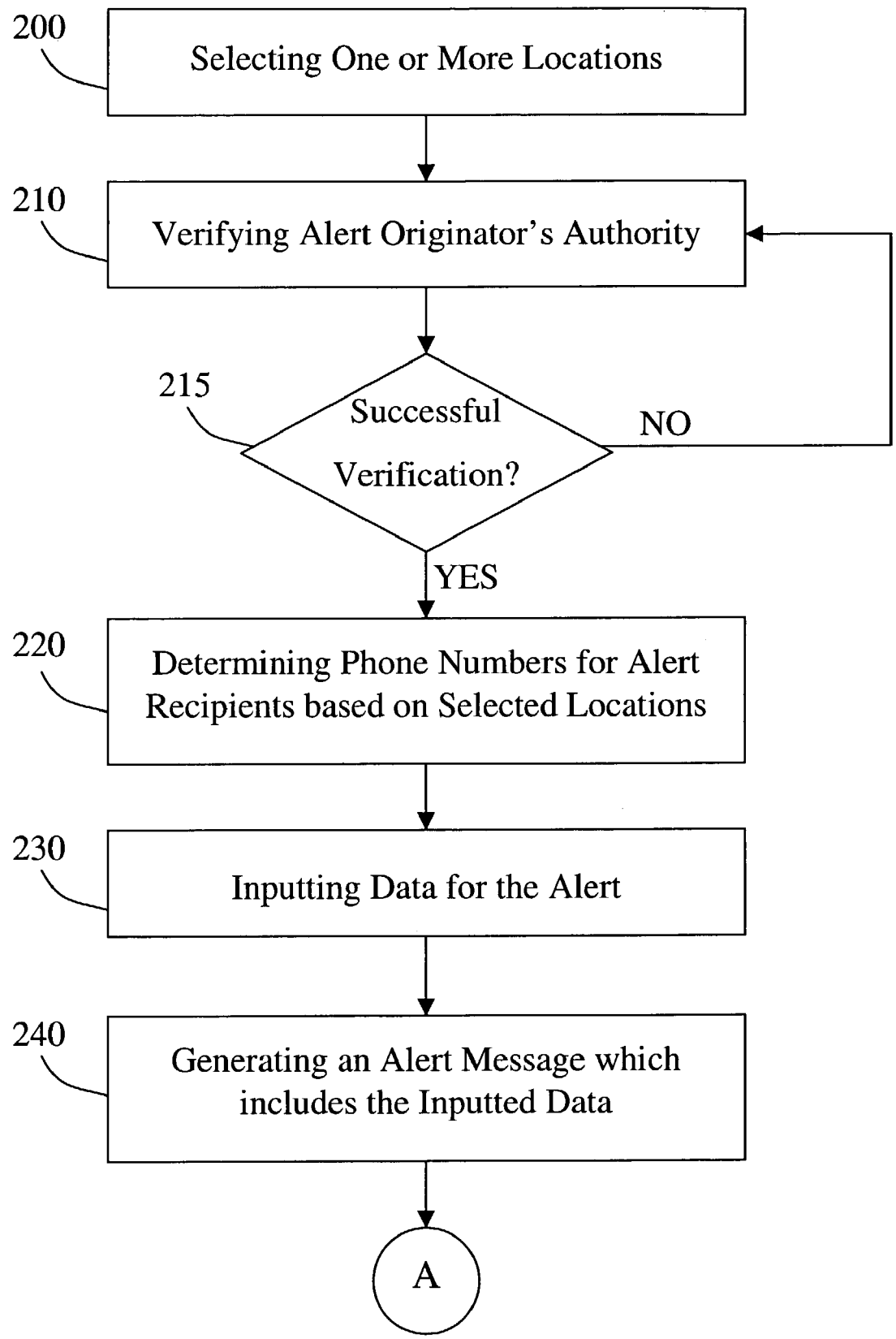
FIGS. 2A-2B illustrate another exemplary method for providing an alert.
Figure 2B:
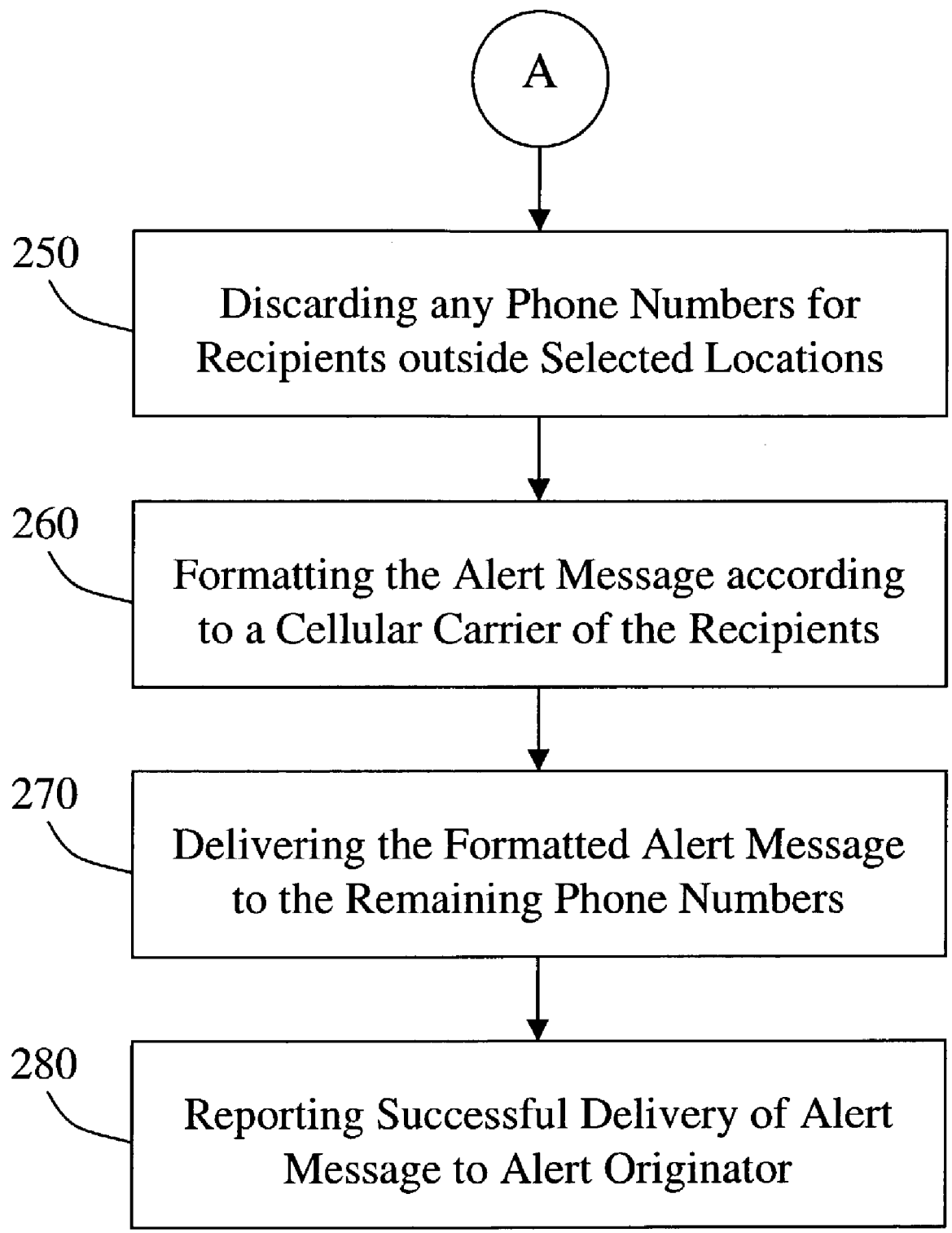

FIGS. 2A and 2B illustrate another exemplary method for providing an alert to a target audience.

In FIG. 2A, an alert originator selects one or more locations, for example using any of the aforementioned approaches (S200). Thus, an alert originator is able to specify the location for an alert to encompass with increased precision. Preferably, but not necessarily, the alert originator contacts a website to select the one or more locations.

Preferably, but not necessarily, the alert originator's authority is verified as a security measure (S210). For example, the alert originator is required to enter a correct user name and password. Preferably, but not necessarily, the alert originator's authority is verified before performing any alert recipient determinations. The alert originator may also be required, as an additional security measure, to verbally provide an identification code before delivery of the alert message will commence. Preferably, but not necessarily, this "launch code" will be unique to a specific user/entity. Preferably, but not necessarily, the identification code will be changed at random intervals. Additionally, the alert originator can be required to verbally provide the identification code to another "live" individual, thereby providing a sort of "fail-safe" to keep unauthorized individuals from sending an unwarranted alert.

When verification of the alert originator's authority fails (S215, NO), repeated attempts are made to verify the alert originator's authority.

Upon successful verification of the alert originator's authority (S215, YES), phone numbers for recipients of alert are determined based on the selected one or more locations (S220). Preferably, but not necessarily, these phone numbers are cellular phone numbers. For example, a database stores information including cellular phone number information and geographic information.

Preferably, but not necessarily, while the database is proprietary, it can include information from third party resources. For example, the database can be the result of merging two or more existing databases, such as those provided by Bellcore and PC Consultants. In particular, a software program is used to merge data from Bellcore and PC Consultants into a single proprietary system database. The system database can include vertical and horizontal coordinates information, geographic longitude and latitude information, three digit area codes, three digit exchanges, four digit Operating Company Numbers (OCNs), city and state information, and county information. Thus, the database can be populated with the necessary information without using information solicited from or directly provided by any potential recipients. Additionally, information can be retrieved from the system database for display on a website.

The Bellcore database is provided by Telcordia and has monthly updates. The Bellcore database has indicators to describe the type of service in a particular exchange, for example, plain old telephone service (POTS), pager, wireless, etc. Preferably, but not necessarily, only the information relating to wireless devices, as described by Bellcore, is retrieved from the Bellcore database.

Thus, by accessing the system database, cellular phone numbers for the recipients of the alert are retrieved based on the selected one or more locations (S220). Preferably, but not necessarily, the approximate number of potential recipients is calculated by taking the total number of available lines in the defined area and dividing by 2. This formula was derived by taking the stated number of cellular phones from the FCC and the total number of available lines as defined in the Bellcore database. Thus, an alert originator receives an estimate of the number of potential recipients based on the selected one or more locations.

In the event that a sparsely populated (rural) county is selected as a location for the alert, it is possible that zero recipients might be identified based on the selected rural location. This does not necessarily indicate an absence of cell phones in the county, only that no cellular carrier has tandem switches located in the county. Therefore, preferably, but not necessarily, the geographic center of county is determined and a circular search is conducted outward from the center, in order to make sure that viable individuals are located and identified as recipients of the alert. For example, the circular search continues outward to a maximum radius of 100 miles, and for every 25 mile radius covered by the search, a number of located target recipients is reported. Preferably, but not necessarily, the alert originator can halt the search at anytime.

Having determined the cellular phone numbers corresponding to recipients for the alert (S220), the alert originator is prompted for any data to be included in an alert message, such as text and/or image data (S230). As discussed above, preferably, but not necessarily, the alert originator contacts a website to input the text data for the alert message.

Thereafter, an alert message is generated to include any data input by the alert originator (S240). The alert message can be in a proprietary format or can adhere to an established standard, such as for SMS messages.

Preferably, but not necessarily, cellular phone numbers for recipients that have left the targeted area are discarded (S250). Likewise, individuals that are "roaming" in the targeted area can be considered recipients and their cellular phone numbers added to the information relating to the determined recipients. These features are provided by accessing the cellular Home Location Register (HLR) and Visitor Location Register (VLR) databases of the various cellular carriers servicing the targeted area. The information available from these databases include the ten digit number of a cellular subscriber, an Electronic Serial Number (ESN) that associates the cellular subscriber's phone number with the cellular subscriber's current wireless device, and the carrier identification. These databases are constantly and instantaneously updated as cellular subscribers move from one area to another. Interfacing with these databases provides numerous advantages. For example, interfacing with the HLR and VLR databases allows for the effective delivery of messages to individuals in high tourist traffic areas, such as Disney World, who would otherwise not receive the alert message because their home location was not a targeted location. Furthermore, the sending of alert messages to individuals who are traveling outside of their home location and therefore have no need for the notification in the targeted area, can be avoided.

Furthermore, prior to delivery of the alert message to the recipients via their cellular phones, the alert message is formatted to comply with the particular address format of each cellular carrier that provides service to one or more of the recipients (S260). The aforementioned OCNs, retrieved from the system database, indicate the identity of the relevant cellular carriers. An address format used by each of these relevant cellular carriers is determined and is used to format the alert message for delivery to those recipients serviced by each of the relevant cellular carriers. For example, if it is determined that a particular three digit exchange belongs to AT&T, those 10,000 alert messages would be formatted as 10DIGITS@mobile.att.net. Another exchange might belong to Verizon, such that an address format of 10DIGITS@vtext.com is used, and another exchange might belong to Cingular, such that a format of 10DIGITS@mobile.mycingular.com is used. The proper address format (e.g., e-mail address) for every cellular entity can be cataloged and stored, for example in the system database.

Alternatively, secondary integration can increase efficiency, although it requires third party cooperation. For example, instead of formatting and sending the 10,000 alert messages, as described above, a single alert message is sent to the cellular carrier's SMS server with instructions for that server to launch a corresponding message to all cell phones currently registered in the server's HLR/VLR database. This approach would require cooperation from, and connectivity to, the targeted cellular carriers, but would speed the delivery of the alert message to the targeted recipients.

Once the alert message has been properly formatted based on the recipients' cellular carriers (S260), these formatted alert messages are delivered to the recipients via their cellular devices, such as cellular phones (S270). Preferably, but not necessarily, the formatted alert messages are delivered to the appropriate cellular carriers via the Internet. Optionally, once the alert message has been delivered, the alert originator is notified of the delivery completion, for example via e-mail (S280).

Figure 3:
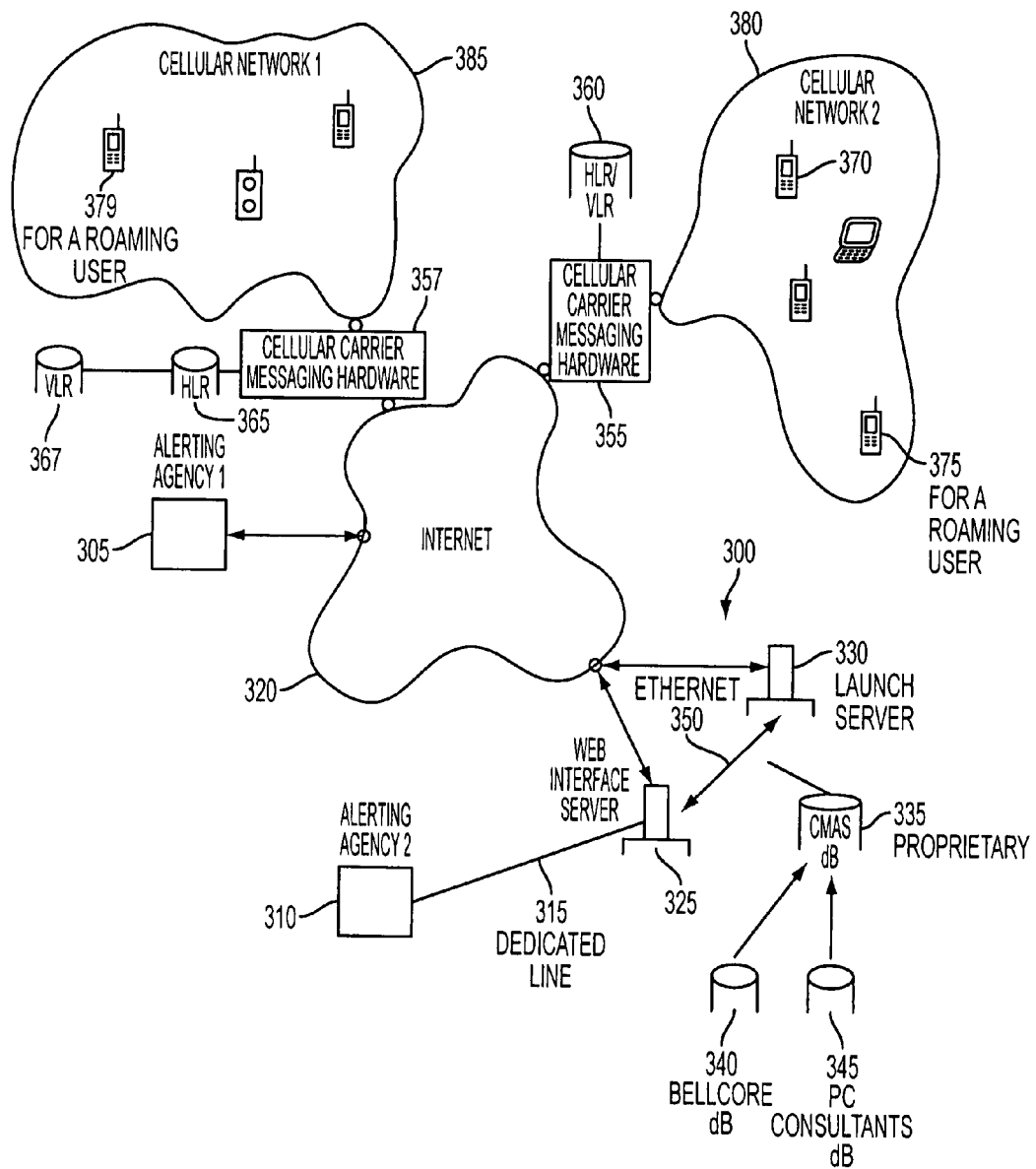
FIG. 3 illustrates an exemplary system and network architecture for providing an alert.

FIG. 3 illustrates an exemplary system for providing an alert 300, and the related network layout. In FIG. 3, a web interface server 325 and a launch server 330 are connected through a network connection, such as an Ethernet connection 350. Of course, the web interface server 325 and the launch server 330 can be integrated into a single server, which combines the functionality of the individual servers.

A first alerting agency 305 connects to the web interface server 325 via the Internet 320, while a second alerting agency 310 connects to the web interface server 325 via a dedicated communications line 315.

The web interface server 325 displays information to alerting agencies 305 and 310, for example in the form of one or more web pages. The alerting agencies 305 and 310 can interact with these web pages through the web interface server 325 to select one or more locations for an alert to encompass, using any of the approaches discussed above.

Figure 4:
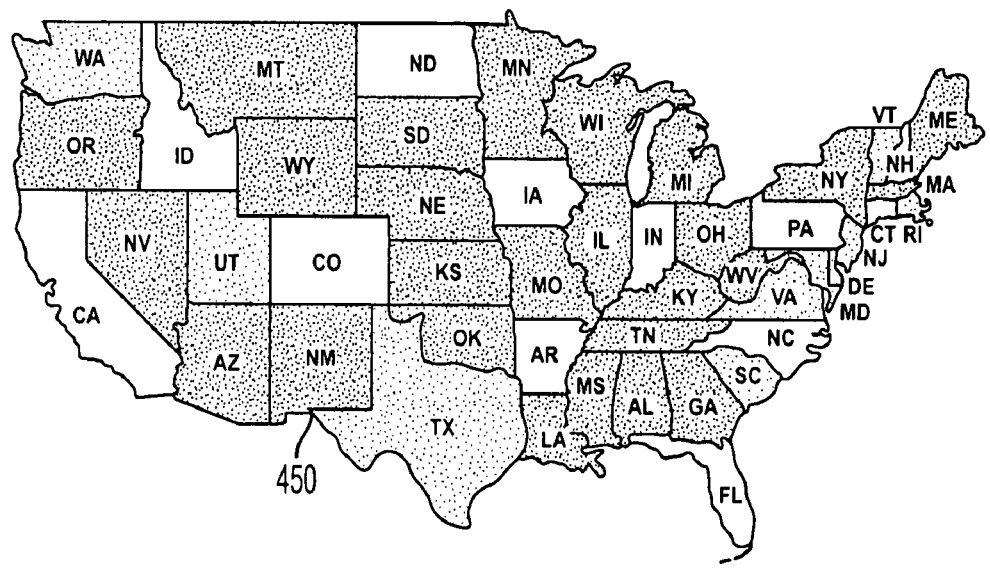
FIG. 4 illustrates exemplary approaches for selecting locations for an alert to encompass.

For example, as illustrated in FIG. 4, an alerting agency can elect to choose an individual state and/or county to send an alert (405), can choose a selected security force (410), or use an input device to drag a box around a target area of a displayed map (420). In addition to containing the map 450, the web page displayed by web interface server 325 can also contain a box 440 containing the current longitude and latitude coordinates.

Figure 5:
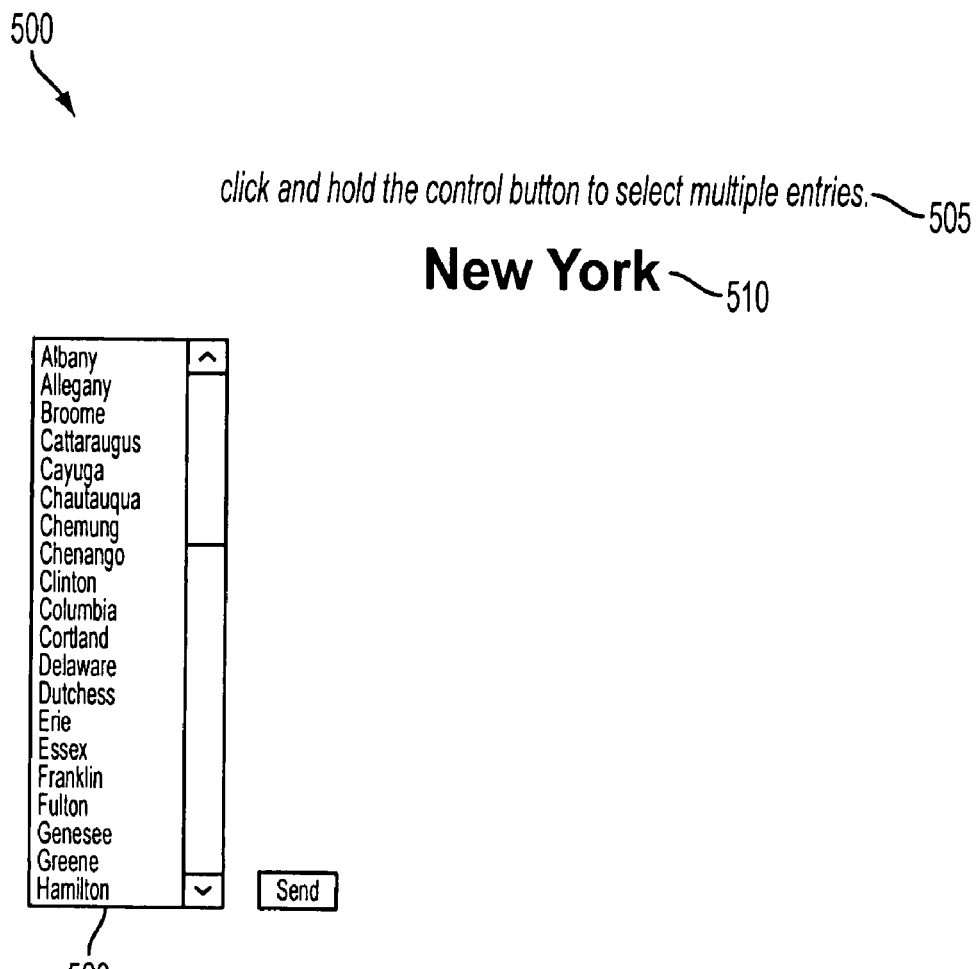
FIG. 5 illustrates an exemplary location selection menu.

Furthermore, as illustrated in FIG. 5, the contents of a web page displayed by the web interface server 325 can represent a sub-menu within a menu hierarchy. The sub-menu 500 of FIG. 5 was displayed in response to an alerting agency 305 or 310 selecting New York 510 as a state containing counties to be targeted by the alert. The sub-menu 500 includes a scrollable list 520 of all of the counties in New York. The web page provides instructions to an alerting agency 305 or 310 for selecting one or more locations, for example "click and hold the control button to select multiple entries" (505).

Once an area for the alert has been defined, the web interface server 325 accesses a system database 335 in order to determine the recipients for the alert within the defined area. The system database 335 can include data from third-party databases such as a Bellcore database 340 and a PC Consultants database 345, as shown in FIG. 3.

Having determined whom the recipients of the alert message will be, the web interface server 325 receives message data from an alerting agency 305 or 310 to be included in the alert message. As discussed above, a web page can contain a text box for collection of text data, whereby an alerting agency 305 or 310 types their text data directly in the text box of the web page.

Figure 6:
FIG. 6 illustrates an exemplary data input screen.

FIG. 6 illustrates an exemplary data input screen 600, including a display of the estimated number of recipients for the selected one or more locations (605) and a text box 610 for entering message data to be included in the alert message. Because some text message standards (e.g., SMS) place character limits on their messages, the data input screen 600 indicates a maximum number of characters permitted in an alert message (620), and the data input screen 600 includes a box indicating the number of characters remaining that can be input for the alert message (625). Additionally, the data input screen 600 includes a "send" button 640 for sending the message data contained in the text box 610 and a "clear" button 645 for clearing the contents of the text box 610.

Figure 7:
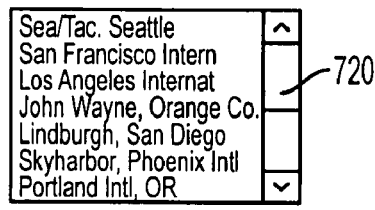
FIG. 7 illustrates another exemplary data input screen.

FIG. 7 illustrates another exemplary data input screen 700, including instructions for selection multiple locations for the alert (705), a scrollable list of predefined alert locations (i.e., airports) 720, a text box 730 for entering message data to be included in the alert message, an indication of the number of characters remaining that can be input for the alert message (740), and a "clear" button 750 for clearing the contents of the text box 730. Additionally, the data input screen 700 also includes an authentication code field 760 and a user name field 765 for an alerting agency 305 or 310 to input their authentication code and user name, thereby verifying their authorization to send alert messages.

The web interface server 325 combines the input message data with the information polled from the system database and outputs the result to a file. The web interface server 325 then transfers this file to the web launch server 330, for example over Ethernet connection 350.

The launch server 330 accesses the system database 335 in order to determine an address format that a particular cellular carrier 380 or 385 utilizes for receiving text messages. Thereafter, the launch server 330 formats the alert message to comply with an address format of a particular cellular carrier providing service to the recipients. The launch server 330 then sends the formatted messages to a public network (the Internet 320), for example via a Cisco router interface. With up to 40 Megs of burstable bandwidth, the launch server 330 can send up to 100,000 messages per minute.

Alternatively, instead of formatting the alert message based on a particular cellular carrier 380 or 385, the launch server 330 simply sends the unformatted alert message to the SMS server 355/357 of the cellular carrier 380/385 with instructions for the SMS server 355/357 to launch a properly formatted message to all cellular phone currently registered in the SMS server's HLR/VLR database 360.

Once the messages have been delivered, the launch server 330 preferably, but not necessarily, sends an e-mail receipt to the alerting agency 305 or 310 as notification of delivery completion.

Preferably, but not necessarily, the launch server 330 accesses HLR databases and VLR databases to determine which intended recipients are outside of the targeted area, as well as to determine if any individuals are "roaming" in the targeted area and should therefore be considered intended recipients of the alert message. For example, in a targeted area corresponding to the cellular network 385, the launch server accesses HLR database 365 and VLR database 367, and determines that intended recipient 375 is not currently in the targeted area, while roaming user 379 is currently in the targeted area. Therefore, the launch server 330 insures that the cellular subscriber 375 does not receive the alert message, while the roaming user 379 does receive the alert message.

Preferably, but not necessarily, the alert system 300 is operated by a single agency, for example the Department of Homeland Security. Other agencies, for example local law enforcement agencies, would access the alert system 300 through the Department's website. The Department's personnel would be responsible for verifying and authenticating all external alert originators, as well as for the actual launch of the prescribed alert.

Alternatively, the software and hardware constituting the alert system 300 can be distributed to numerous agencies and organizations at the national, state, and local levels. Thus, the hardware of the alert system 300 can be installed and managed on an agency-by-agency basis. Thus, individuals at each installation site would be responsible for verifying/authenticating.

One advantage to this de-centralized approach is that it would facilitate communities to use the alert system 300 in different ways. For example, while the Los Angeles Police Department might only launch messages that adhere to today's Amber Alert criteria, a Sheriff in a rural community might launch a message for a far more minor incident, such as a stolen car or a lost cat.

Preferably, but not necessarily, the hardware of the alert system 300, such as the web interface server 325, the launch server 330, and the system database 335, is duplicated at another secure location. For example, the alert system 300, which is located for example in Dallas, Tex., is duplicated at a location in Los Angeles, Calif. Furthermore, the network itself is designed to reroute traffic, should one site be down. This redundancy substantially increases the reliability of disseminating an alert to the public using the alert system 300.

Thus, various exemplary embodiments of a method and system for providing emergency information to a targeted percentage of the population in a specified geographical region, including the utilization of existing wireless communication devices and networks, such as cellular phones and carriers, are disclosed.

It will be appreciated by persons skilled in the art that the present invention is not limited to what has been particularly shown and described hereinabove. Rather the scope of the present invention is defined by the append claims and changes may be made in the form, construction, procedure and arrangement of its various steps and elements without departing from its spirit or scope.

We claim:

1. A method of providing an emergency alert message describing an emergency situation, comprising:

selecting, by an alert originator, a geographical location for the alert message to encompass;

determining, from a cellular network database, those cellular networks that cover the geographical location selected by the alert originator, each of the cellular networks containing a server for launching messages, and each of the cellular networks containing at least one of a Visitor Location Register and a Home Location Register database containing phone numbers respectively corresponding to wireless devices presently within the selected geographical location;

sending, by said alert originator, an emergency alert message to the server of each of the determined cellular networks that cover the geographical location, the emergency alert message sent by said alert originator containing instructions for causing each of the cellular networks to query its at least one Visitor Location Register and Home Location Register databases to determine those wireless device phone numbers presently within the selected geographical location, and thereafter to initiate and deliver the emergency alert message to the determined wireless devices presently within the selected geographical location;

wherein the at least one Visitor Location Register and Home Location Register databases being constantly updated in real time so that the phone number of a wireless device that roams into the selected geographical location is contained in at least one of the Visitor Location Register and Home Location Register databases and a phone number of a wireless device that roams out of the selected geographical area is not contained in the at least one Visitor Location Register and Home Location databases.

2. The method of claim 1, wherein the emergency alert message sent by said alert originator is a single message.

3. The method of claim 1, wherein the selecting of the geographical location includes connecting to a web site and interacting with the web site to define the geographical location.

4. The method of claim 1, wherein the selecting of the geographical location is through interaction with a predefined image.

5. The method of claim 1, wherein the selecting of the geographical location comprises:
listing all fifty states;
when a state is selected, listing a plurality of cities located in the state; and
selecting at least one of the listed cities as the geographical location.

6. The method of claim 1, wherein the selecting of the geographical location comprises:
displaying a map of a predefined area;
indicating at least one sub-area within the predefined area; and
converting each sub-area into a corresponding location for the emergency alert message.

7. The method of claim 1, wherein the selecting of the geographical location comprises:
connecting to a web site, said web site presenting a map of at least one state;
drawing at least one geometric shape on the map; and
converting each geometric shape into a corresponding geographical location for the emergency alert message.

8. The method of claim 1, further comprising, for the selected geographical location:
determining a geographic center of the selected geographical location;
searching outward from the geographic center in a circular pattern; and
reporting a number of wireless devices found for every predetermined outward search distance interval to the alert originator,
wherein when a maximum outward search distance is reached, said searching is halted.

9. The method of claim 1, wherein the emergency alert message sent to the determined wireless devices presently within the selected geographical location is an SMS message.

10. The method of claim 1, wherein the selected geographical location corresponds to a target location of a terrorist activity.

11. A computer system embodying a computer program product for enabling a computer to provide an alert message, comprising:

software instructions for enabling the computer to perform predetermined operations, and
a computer readable medium bearing the software instructions;
wherein the predetermined operations include:
receiving, from an alert originator, a geographical location for the alert message to encompass;
determining, from a cellular network database, those cellular networks that covet the geographical location selected by the alert originator, each of the cellular networks containing a server and each of the cellular networks containing at least one of a Visitor Location Register database and a Home Location Register database containing phone numbers respectively corresponding to wireless devices presently within the selected geographical location;
sending, by said alert originator, an emergency alert message to the server of each of the determined cellular networks that cover the geographical location, the emergency alert message sent by said alert originator containing instructions for causing each of the cellular networks to query
the at least one Visitor Location Register and Home Location Register databases associated with the determined cellular networks to determine those wireless device phone numbers presently within the selected geographical location, and thereafter
to initiate and cause the emergency alert message to be directly delivered to the determined wireless devices presently within the selected geographical location;
wherein the at least one Visitor Location Register and Home Location Register databases being constantly updated in real time so that the phone number of a wireless device that roams into the selected geographical location is contained in at least one of the Visitor Location Register and Home Location Register databases and a phone number of a wireless device that roams out of the selected geographical area is not contained in the at least one Visitor Location Register and Home Location databases.

12. The computer system of claim 11, wherein the emergency alert message sent by the alert originator and containing instructions is a single message.

13. The computer system of claim 11, wherein the selecting at least one location includes connecting to a web site and interacting with the web site to define the geographical location.

14. The computer system of claim 11, wherein the selecting of the geographical location is through interaction with a predefined image.

15. The computer system of claim 11, wherein the selecting of the geographical location comprises:
displaying a map of a predefined area;
indicating at least one sub-area within the predefined area; and
converting each sub-area into a corresponding geographical location for the emergency alert message.

16. The computer system of claim 11, wherein the selecting of the geographical location comprises:
connecting to a web site, said web site presenting a map of at least one state;
drawing at least one geometric shape on the map; and
converting each geometric shape into a corresponding geographical location for the emergency alert message.

17. The computer system of claim 11, wherein the predetermined operations further include for the selected geographical location:

determining the geographic center of the selected location;
searching outward from the geographic center in a circular pattern; and
reporting a number of wireless devices found for every predetermined outward search distance interval to the alert originator,
wherein when a maximum outward search distance is reached, said searching is halted.

18. The computer system of claim 11, wherein the emergency alert message is an SMS message.

19. A system for providing an emergency alert message describing an emergency situation, comprising:
an alert originator for selecting a geographical location for the alert message to encompass;
a cellular network database for determining those cellular networks that cover the geographical location selected by the alert originator, each of the cellular networks containing a server for launching messages, and each of the cellular networks containing at least one of a Visitor Location Register and a Home Location Register database containing phone numbers respectively corresponding to wireless devices presently within the selected geographical location;
said alert originator operable for sending an emergency alert message to the server of each of the determined cellular networks that cover the geographical location, the emergency alert message sent by said alert originator containing instructions for causing each of the cellular networks to query its at least one Visitor Location Register and Home Location Register databases to determine those wireless device phone numbers presently within the selected geographical location, and thereafter to initiate and deliver the emergency alert message to the determined wireless devices presently within the selected geographical location;
wherein the at least one Visitor Location Register and Home Location Register databases being constantly updated in real time so that the phone number of a wireless device that roams into the selected geographical location is contained in at least one of the Visitor Location Register and Home Location Register databases and a phone number of a wireless device that roams out of the selected geographical area is not contained in the at least one Visitor Location Register and Home Location databases.

20. The system according to claim 19, wherein the emergency alert message sent by said alert originator to the server of each of the determined cellular networks is a single message.

21. The system according to claim 19, wherein the emergency alert message delivered to the determined wireless devices presently within the selected geographical location is an SMS message.

22. The system according to claim 19, wherein said alert originator is operable for determining the geographic center of the selected location, searching outward in a circular pattern by a predetermined outward search distance from the geographic center until a maximum outward search distance is reached.

* * * * *